United States Patent [19]

Tsuruta et al.

[11] 4,062,777

[45] Dec. 13, 1977

[54] SOLID-FLUID CONTACTING APPARATUS

[75] Inventors: Hidemasa Tsuruta; Ryoichi Nemoto, both of Tokyo, Japan

[73] Assignee: Nittetu Chemical Engineering Ltd., Tokyo, Japan

[21] Appl. No.: 686,400

[22] Filed: May 14, 1976

[30] Foreign Application Priority Data

May 21, 1975 Japan .................................. 50-59687

[51] Int. Cl.$^2$ ............................................. B01D 23/14
[52] U.S. Cl. .................................... 210/264; 210/278; 210/284; 55/179
[58] Field of Search ...................... 55/59, 62, 179, 387, 55/389; 210/264, 278, 277, 275, 284, 282

[56] References Cited

U.S. PATENT DOCUMENTS

| 769,143 | 9/1904 | Boellinghaus | 210/284 X |
| 2,785,803 | 3/1957 | Young | 210/282 |
| 3,302,791 | 2/1967 | Assalini et al. | 210/264 X |
| 3,547,270 | 12/1970 | Kass | 210/264 |

Primary Examiner—Wilbur L. Bascomb, Jr.
Assistant Examiner—Robert H. Spitzer

Attorney, Agent, or Firm—Bacon & Thomas

[57] ABSTRACT

A solid-fluid contacting apparatus, comprising an outer generally tubular housing member, preferably cylindrical in shape; an inner generally tubular housing member defining a fluid flow channel therein and being placed inside of the outer housing member and being generally coaxially aligned therewith, preferably concentrically, to define a space therebetween, preferably an annular space; at least one means extending radially between the inner and outer housing members for partitioning the space into a plurality of axially spaced contacting zones; at least one means extending axially within the inner housing member for partitioning the fluid flow channel into a plurality of fluid flow sub-channels; means in each of the contacting zones for receiving the solid; and a fluid flow inlet communicating between each of the subchannels and one of the contacting zones, a fluid flow outlet communicating between each of the contacting zones and its respective subchannel, and means positioned in each subchannel between the inlet and outlet for preventing fluid flow through the sub-channel.

14 Claims, 4 Drawing Figures

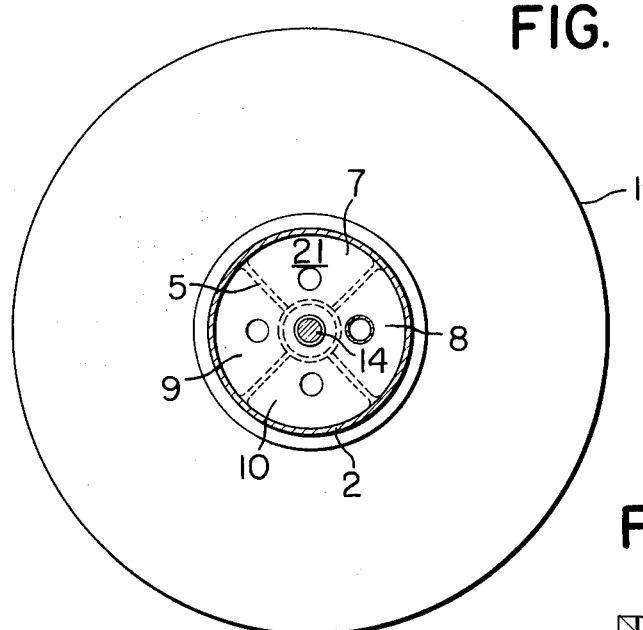
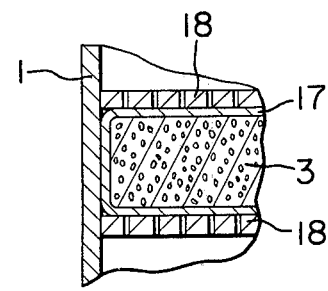
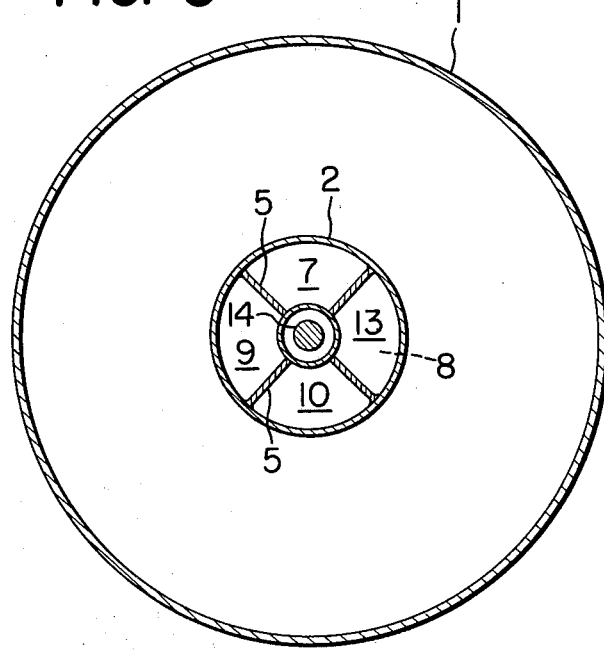

SOLID-FLUID CONTACTING APPARATUS

BACKGROUND OF THE INVENTION

This invention relates to a solid-fluid contacting apparatus and more especially to a solid-fluid contacting apparatus suitable for use in adsorption and desorption of fluid components by solid adsorbents and for flow type catalytic reactions and regeneration procedures.

There have thus far been proposed various diverse methods using a fixed bed, a fluidized bed or a moving bed for establishing contact between a solid and a fluid, in connection with adsorption, desorption, catalytic reaction and regeneration procedures, as well as corresponding apparatus for industrial application of these methods. Where two different operations such as adsorption and desorption or catalytic reaction and regeneration are required to be effected simultaneously or in parallel for continuous operation over a long time period, it has been the usual practice in the art to install a number of similar pieces of equipment in juxtaposition for alternate or sequential use or to use a separate apparatus for the process step of secondary nature or the step which takes a relatively short time (e.g., regeneration), and then returning the regenerated solid material to the main process. However, these methods invariably require apparatus of complicated construction as well as complicated operations, resulting in large increases in production and equipment costs.

On the other hand, more recently the quantities of fluids to be handled have increased considerably due to construction of large-scale chemical plants or large-sized printing and coating installations, necessitating provision of large solid-fluid contacting apparatus for use in adsorption or other chemical reaction processes. The conventional types of solid-fluid contacting apparatus have thus far been adapted to cope with the increases in the amount of fluid to be handled by increasing the diameters of the apparatus in order to increase the cross-sectional area for fluid flow or simply by increasing the number of pieces of apparatus. In any event, these countermeasures only contribute to an increase in required floor space or to an increase in the degree of complication of the equipment. The recent enforcement of severe regulations against air pollution, for example, also necessitates installation of large activated carbon adsorption apparatus in printing and coating shops to remove and collect by adsorption the organic solvents which are entrained in the exhaust gases. Manufacturers who have only limited space cannot comply with such requirements, since under the present circumstances this would unavoidably require a substantial enlargement in floor space.

SUMMARY OF THE INVENTION

The present invention has as its object the elimination of the above-mentioned drawbacks of conventional solid-fluid contacting apparatus.

Another object of the invention resides in the provision of an apparatus of compact and simple construction which requires only an amount of floor space similar to that usually occupied by a single unit but which has a cross-sectional area available for fluid-solid contact comparable in effect to a number of juxtaposed units.

It is also an object of the invention to provide a solid-fluid contacting apparatus which permits different operations, such as adsorption and regeneration or reaction and regenerative reactivation, to proceed simultaneously within a unitary column structure.

In accomplishing the foregoing objects, there has been provided in accordance with the present invention a solid-fluid contacting apparatus, comprising: (a) an outer generally tubular housing member, preferably cylindrical in shape; (b) an inner generally tubular housing member defining a fluid flow channel therein and being placed inside of the outer housing member and being generally coaxially aligned therewith preferably concentrically, to define a space therebetween, preferably an annular space; (c) at least one means extending radially between the inner and outer housing members for partitioning the space into a plurality of axially spaced contacting zones; (d) at least one means extending axially within the inner housing member for partitioning the fluid flow channel into a plurality of fluid flow sub-channels; (e) means in each of the contacting zones for receiving the solid; and (f) a fluid flow inlet communicating between each of the subchannels and one of the contacting zones, a fluid flow outlet communicating between each of the contacting zones and its respective subchannel, and means positioned in each subchannel between the inlet and outlet for preventing fluid flow through the subchannel.

Further objects, features and advantages of the invention will become apparent as the invention is described more particularly hereafter in connection with a preferred embodiment of the invention which is employed by way of example as an adsorption column using packed layers of activated carbon for the adsorption of organic solvent vapors in an exhaust gas, reference being had to the accompanying drawings.

BRIEF DESCRIPTION OF THE DRAWINGS

In the drawings:

FIG. 1 is a plan view, partly in section, of the fluid-solid contacting apparatus of the present invention, taken on the line 1—1 of FIG. 2;

FIG. 3 is a horizontal sectional view, taken in the line 3—3 of FIG. 2; and FIG. 4 is an enlarged fragmentary vertical sectional view of a modified form of one of the layers of solid material.

DESCRIPTION OF THE PREFERRED EMBODIMENTS

Figure 2:
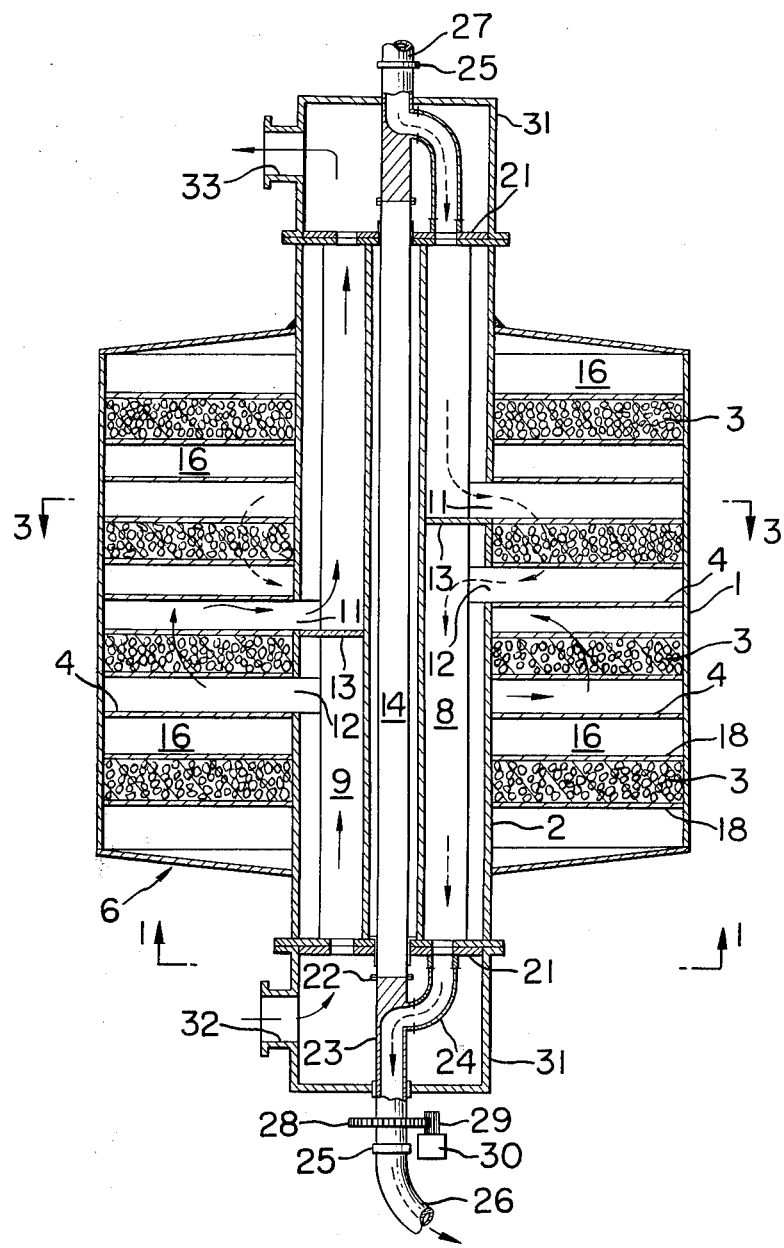
FIG. 2 is a fragmentary vertical sectional view of the apparatus of FIG. 1.

The embodiment of the invention illustrated in FIGS. 1–3 is provided with four packed layers of activated carbon, of which three layers are used at any one time for adsorption by contact with the gas to be purified while one layer is sequentially subjected to an operation for regeneration of the spent activated carbon. The adsorption column 6 consists of an outer cylinder 1 and an inner cylinder 2, defining therebetween an annular space having a number of packed layers 3 of a solid, in this case, activated carbon, supported by or between suitable shelf means. The layers of solid material 3 may be arranged and supported as follows: (a) the solid material may be put into a bag of fluid permeable material and the bag then placed onto a plate (perforated plate or grid); (b) the solid material may be placed directly on such plate; or (c) the solid material may be packed in a space between an upper and a lower plate. In FIG. 4 the solid material is placed inside of porous bag 17 and the layer of solid is further confined between perforated plates 18. The packed layers 3 are separated independently from the adjacent layers by means of solid partition plates 4. The partition plates 4 divide the annular space into a plurality of axially spaced contacting zones or chambers 16, each of which contains solid material for contacting with the fluid. The inner cylinder 2 is divided into four independent fluid passages 7 through 10 by means of inner partition plates 5, and each fluid passage communicates with a corresponding one of the contacting zones 16 and the packed layer 3 contained therein.

In the particular embodiment shown, the fluid passage 7 is in communication with the uppermost packed layer 3, the fluid passage 8 with the second packed layer 3, the fluid passage 9 with the third packed layer 3, and the fluid passage 10 with the lowermost packed layer 3. The respective fluid passages have openings 11 and 12 apertured through the wall of the inner cylinder, one each on the upper and lower sides of the corresponding packed layers to provide inlets and outlets for the gases which are to be fed from the respective fluid passages to the contacting zones 16 for contact with the packed layers of solid material. The gas inlet and outlet (11 or 12) of each contacting zone are insulated from each other by means of a partition wall 13 located in the passage between the inlet and outlet. This is illustrated more clearly in FIG. 3 which shows passages 7, 9 and 10 open and passage 8 closed of by plate 13. In other words, the exhaust gas or the desorption steam flowing through the fluid passages within the inner cylinder is caused to flow into the contacting zone in the annular space between the inner and outer cylinders through an opening 12 or 11, whichever is positioned on the upstream side, whereupon it is caused to pass upwardly or downwardly through the respective packed layers 3 to effect the adsorption or desorption before being able to leave the contacting zone via the outlet opening. The gases which have passed through the respective packed layers are then led back into the respective fluid passage in the inner cylinder through the openings 11 or 12 on the downstream side as a refined gas or as desorption vapors.

Thus, four independent packed layers 3 are provided in the unitary structure of the adsorption column 6. As will be understood from the foregoing description, the different operations of, on the one hand, adsorption treatment of an exhaust gas and, on the other hand, desorption by steam can be performed in parallel fashion by a single adsorption column 6 by means of the four independent packed layers 3. In such an instance, an exhaust gas containing organic solvent vapors may be fed to three of the four fluid passages in the inner cylinder, for example, firstly to 7, 9 and 10 from the lower ends thereof by means of a suitable valve arrangement to refine and purify the gas by adsorption treatment through the corresponding packed layers. The solvent containing exhaust gas is prevented from entering the remaining fluid passage 8, to which instead steam is fed from the upper end thereof in order to desorb the organic solvent vapors which have been adsorbed by the solid in a previous step and collect them by the use of any means provided at the downstream of the lower end of the fluid passage. This desorption by steam (in one stage) and adsorption of vapors (in the remaining three stages) is shifted sequentially from one fluid passage to another to selectively desorb the adsorbed vapors from each layer of solid in turn.

In this instance, it is advantageous to use a center axle 14 for operating rotary valves at the upper and lower ends of the adsorption column in synchronism with each other. The structure of a suitable rotary valve is illustrated in FIGS. 1 and 2. A valve assembly comprising a plate 21 is rigidly secured, at both the top and the bottom of the inner cylinder 2, to the center shaft 14 which is coupled via coupling element 22 to a conduit 23 through which a first fluid passes. The plate 21, in this embodiment, is provided with four openings angularly equally spaced with each other, of which three openings are in communication with a chamber defined by a housing 31 while remainder one opening is connected to the conduit 23, for example, by means of a flexible pipe 24. Each conduit is connected via suitable sealing member, such as a conical shaped joint 25, to a fluid outlet 26 or inlet 27. To one of the conduits 23 is fixed rigidly a girth gear 28 to which, by means of a pinion gear 29, is mechanically coupled a suitable power source, such as a step motor 30, by which the center shaft 14 can be rotated. In the position illustrated, channel 8 is in communication with the conduit 23 at top and bottom to permit steam to be introduced via inlet 27, transported downwardly through the apparatus (as shown by the dashed arrows) and withdrawn from the apparatus via outlet 26 at the bottom. The remaining three channels 7, 9 and 10 are utilizable for treating a second fluid being introduced via inlet 32 provided in the bottom housing 31, being transported upwardly through the apparatus (as illustrated by the solid arrows in channel 9 shown in FIG. 2) and being withdrawn via outlet 33 in the housing 31 at the top.

In this manner, with the adsorption column according to the invention, the number of adsorption layers can be increased or reduced as desired in response to the amount of the gas to be treated or to the time durations of the switching cycles of different operations, completely independently of the available installation floor space. In addition, it becomes possible to simplify the construction and switching mechanisms of the respective gas passages and to reduce the installation, operation and maintenance costs to a considerable degree.

The invention has been described in connection with one embodiment in the form of an adsorption column using activated carbon for removing and collecting organic solvent vapors from an exhaust gas. However, it will be understood that, in addition to the adsorption column with packed layers of an adsorbent, the apparatus according to the invention can find wide applications as means for establishing contact between a solid and a fluid, including liquid as well as gas, for example, in fixed and fluidized beds for solid catalytic reactions, heat accumulating type heat-exchangers and the like. Such applications and other obvious modifications will be encompassed within the present invention, which is defined by the claims appended hereto.

What is claimed is:

1. An apparatus for contacting a fluid with a solid material contained in a plurality of independent contacting units within the apparatus, comprising:
    a. an outer generally tubular housing member;
    b. an inner generally tubular housing member defining a fluid flow channel therein and being placed inside of said outer housing member and being generally coaxially aligned therewith to define a space therebetween;
    c. at least one means extending radially between said inner and outer housing members for partitioning said space into a plurality of separate, axially spaced contacting zones;

d. at least one means extending axially within said inner housing member for partitioning said fluid flow channel into a plurality of fluid flow sub-channels, corresponding in number to the number of said contacting zones;

e. means within each of said contacting zones for receiving said solid; and f. at least one fluid flow inlet and at least one fluid flow outlet, said inlets and outlets corresponding in number to the number of said contacting zones, and each of said inlets and outlets connecting a single one of said contacting zones to a single one of said sub-channels, and means positioned in each sub-channel between said inlet and outlet for preventing fluid flow through said sub-channel such that each contacting zone, and its respective sub-channel, fluid flow inlet and outlet define a contacting unit independent from other such contacting units wherein each of said sub-channels forms an exclusive supply and discharge passage for its respective contacting zone.

2. The apparatus as defined by claim 1, wherein said outer and inner housing members comprise concentrically aligned cylinders.

3. The apparatus as defined by claim 2, wherein said radial partitioning means comprises an annular plate.

4. The apparatus as defined by claim 2, wherein each of said solid receiving means comprises at least one fluid permeable porous plate member adapted for receiving an annular-shaped layer of solid.

5. The apparatus as defined by claim 4, wherein said solid receiving means further comprises in addition to said porous plate member, a flexible, porous retaining means for said solid.

6. The apparatus as defined by claim 4 wherein said at least one fluid permeable porous plate member comprises two of said plate members.

7. The apparatus as defined by claim 1, comprising four axial partitioning means dividing said fluid flow channel into four fluid flow sub-channels and three radial partitioning means dividing said space into four contacting zones.

8. The apparatus as defined by claim 7, wherein said four axial partitioning means comprise an X-shaped insertion in said inner housing.

9. The apparatus as defined by claim 1, wherein said inlet and outlet are positioned on opposite sides of said solid receiving means in each contacting zone.

10. The apparatus as defined by claim 1, further comprising means for selectively introducing fluid into less than all of said fluid flow sub-channels.

11. The apparatus as defined by claim 10, wherein said selective introducing means comprises a rotary valve.

12. The apparatus as defined by claim 11, wherein said rotary valve is operatively connected to a rotatable shaft mounted centrally within said inner housing member.

13. The apparatus as defined by claim 10, wherein said selective introduction means further includes means for simultaneously introducing a first fluid into some of said sub-channels and a second fluid into other of said sub-channels.

14. The apparatus as defined by claim 1, further comprising a layer of activated carbon in each of said contacting zones.

* * * * *